US008326376B2

(12) United States Patent
Kaneko et al.

(10) Patent No.: US 8,326,376 B2
(45) Date of Patent: Dec. 4, 2012

(54) PORTABLE APPARATUS

(75) Inventors: Masahiro Kaneko, Shinagawa (JP); Masahiro Yanagi, Shinagawa (JP); Hideki Iwata, Shinagawa (JP); Takashi Yuba, Shinagawa (JP); Shigemi Kurashima, Shinagawa (JP); Yuriko Segawa, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 752 days.

(21) Appl. No.: 11/528,313

(22) Filed: Sep. 28, 2006

(65) Prior Publication Data

US 2007/0238492 A1 Oct. 11, 2007

(30) Foreign Application Priority Data

Apr. 11, 2006 (JP) ................................ 2006-108872

(51) Int. Cl.
*H04W 74/00* (2009.01)

(52) U.S. Cl. ............... 455/575.1; 455/343.1; 455/343.2; 455/343.3; 455/343.5; 455/343.6; 343/849

(58) Field of Classification Search .................. 455/573, 455/343.1, 575.1, 575.2, 575.3, 575.4, 575.5, 455/575.6; 343/700, 745, 829, 845, 846, 343/847, 848, 849
See application file for complete search history.

(56) References Cited

U.S. PATENT DOCUMENTS 4,780,724 A * 10/1988 Sharma et al. ......... 343/700 MS
5,736,965 A * 4/1998 Mosebrook et al. .......... 343/702
6,028,555 A * 2/2000 Harano ......................... 343/702
6,061,028 A * 5/2000 Sakata .......................... 343/702
6,380,899 B1 * 4/2002 Madsen et al. ................ 343/702
6,421,016 B1 * 7/2002 Phillips et al. ................ 343/702
7,327,318 B2 * 2/2008 Frank et al. ............ 343/700 MS
7,724,195 B2 5/2010 Yuba et al.
2004/0204188 A1 * 10/2004 Stevens ...................... 455/575.1
2006/0071857 A1 * 4/2006 Pelzer .................... 343/700 MS
2006/0097048 A1 * 5/2006 Mori ............................ 235/439
2006/0109182 A1 * 5/2006 Rosenberg et al. ........... 343/702
2006/0111075 A1 * 5/2006 Seol ........................... 455/343.6
2006/0281500 A1 * 12/2006 Huang et al. ............... 455/575.1

FOREIGN PATENT DOCUMENTS

JP 10-190331 7/1998
JP 2000-013119 1/2000
JP 2000-196327 7/2000
JP 2000-209013 7/2000
WO WO 03043101 A2 * 5/2003

OTHER PUBLICATIONS

"An Omnidirectional and Low-VSWR Antenna for the FCC-approved UWB Frequency Band" by T. Taniguchi and T. Kobayashi (Tokyo Denki University) in 2003 IEEE AP-S International Symp., vol. 3, pp. 460-463, Jun. 22-27, 2003. (Disclosure on Mar. 22 at B201 classroom) disclosures a background art of the present invention.

(Continued)

*Primary Examiner* — Kamran Afshar
*Assistant Examiner* — Khalid Shaheed
(74) *Attorney, Agent, or Firm* — Staas & Halsey LLP

(57) ABSTRACT

A portable apparatus including a flat antenna apparatus is disclosed. The portable apparatus operates with a battery. The flat antenna apparatus includes an antenna element and a ground element, where the ground element is a surface of the battery.

7 Claims, 8 Drawing Sheets

OTHER PUBLICATIONS

Patent Abstracts of Japan, Publication No. 2000-013119, Published Jan. 14, 2000.

Patent Abstracts of Japan, Publication No. 10-190331, Published Jul. 21, 1998.

Patent Abstracts of Japan, Publication No. 2000-209013, Published Jul. 28, 2000.

Office Action issued in Japanese Patent Application No. 2006-108872 dated Feb. 22, 2011.

* cited by examiner

PORTABLE APPARATUS

BACKGROUND OF THE INVENTION

1. Field of the Invention

The present invention generally relates to a portable apparatus, and especially relates to a portable apparatus that includes an antenna apparatus for UWB (ultra-wide band).

2. Description of the Related Art

In recent years and continuing, UWB radio communication technologies have attracted attention for their capabilities of RADAR positioning and large capacity transmission. Especially, since the approval by the U.S. FCC (Federal Communication Commission) in 2002 of UWB for public uses in a frequency band between 3.1 and 10.6 GHz, developments are being actively undertaken for the utilization of UWB.

Since UWB uses a super-wide band, the antenna apparatus for UWB must be capable of super-wideband transmission and reception.

Further, as applications of the antenna apparatus, portable apparatuses used outdoors can be considered.

An antenna for use at the FCC approved 3.1-10.6 GHz band is proposed by Non-Patent Reference 1; the antenna includes a ground plane and a feeder.

FIG. 1A and FIG. 1B show conventional antenna apparatuses 10 and 20, respectively. The antenna apparatus 10 includes a ground plane 11 and a feeder 12 that is shaped like a reversed circular cone. The feeder 12 is provided on the ground plane 11. The side face of the circular cone shape of the feeder 12 has an angle θ to the axis of the circular cone. By adjusting the angle θ, a desired characteristic is acquired.

The antenna apparatus 20 includes a feeder 22 in the shape of a teardrop, configured by a circular cone 22*a* and a sphere 22*b* inscribed in the circular cone 22*a*. The feeder 22 is arranged on the ground plane 11.

[Non-Patent Reference 1]

"An omnidirectional and low-VSWR antenna for the FCC-approved UWB frequency band" by T. Taniguchi and T. Kobayashi (Tokyo Denki University) in 2003 IEEE AP-S International Symp., volume: 3, pp. 460-463, Jun. 22-27, 2003. (Disclosure on March 22 at B201 classroom).

[Patent Reference 1] JPA 2000-196327.

The conventional antenna apparatuses tend to require a great volume because of the feeder of the circular cone or the teardrop on the ground plane; accordingly, miniaturization and a thinner shape are desired.

Applicant hereto has applied for patenting a UWB flat antenna apparatus 30 with JPA 2005-378396, the basic composition of which antenna apparatus 30 is shown by FIG. 2A and FIG. 2B, whereby a certain degree of miniaturization is attained with a thin structure.

The UWB flat antenna apparatus 30 includes a substrate 31, made of a dielectric material, having an upper surface 31*a* and a bottom surface 31*b*. On the upper surface 31*a*, an antenna element pattern 32 shaped like a home plate and a micro strip line 33 that extends from the antenna element pattern 32 are formed. On the bottom surface 31*b*, a ground plane 34 is formed countering the micro strip line 33.

The UWB flat antenna apparatus 30 is made smaller and thinner than the antenna apparatuses 10 and 20. Nevertheless, space sufficient to accommodate the UWB flat antenna apparatus 30 has to be provided in a portable apparatus so that further miniaturization and thinner configuration are required by portable apparatuses.

SUMMARY OF THE INVENTION

The present invention provides a portable apparatus that substantially obviates one or more of the problems caused by the limitations and disadvantages of the related art.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a portable apparatus particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a portable apparatus as follows.

The portable apparatus includes a battery for operations, a surface of which battery constitutes ground potential, and a cover attached to the main body of the portable apparatus for covering the battery. The cover is configured to serve as a flat antenna element, and the surface of the battery serves as a ground plane. The cover and the surface of the battery are closely arranged.

EFFECTIVENESS OF INVENTION

Since the surface of the battery serves as the ground plane, the portable apparatus can be made thinner than where an independent antenna apparatus is used.

Further, since the surface of the battery serves as the ground electric potential when the battery is installed in the portable apparatus, connection of a coaxial cable is dispensed with, simplifying the configuration of the portable apparatus.

DESCRIPTION OF THE PREFERRED EMBODIMENTS

In the following, embodiments of the present invention are described with reference to the accompanying drawings.

Embodiment 1

Figure 1A:
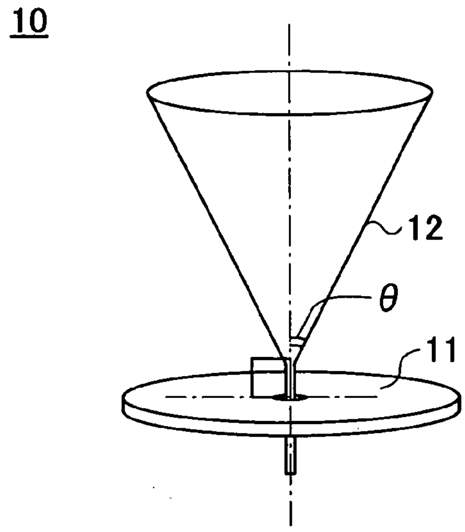
FIG. 1A and FIG. 1B are schematic diagrams of examples of a conventional antenna apparatus.
Figure 1B:
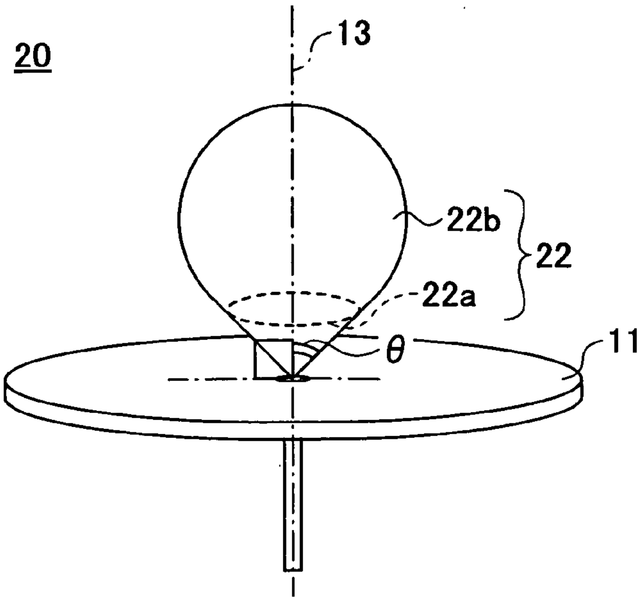
Figure 2A:
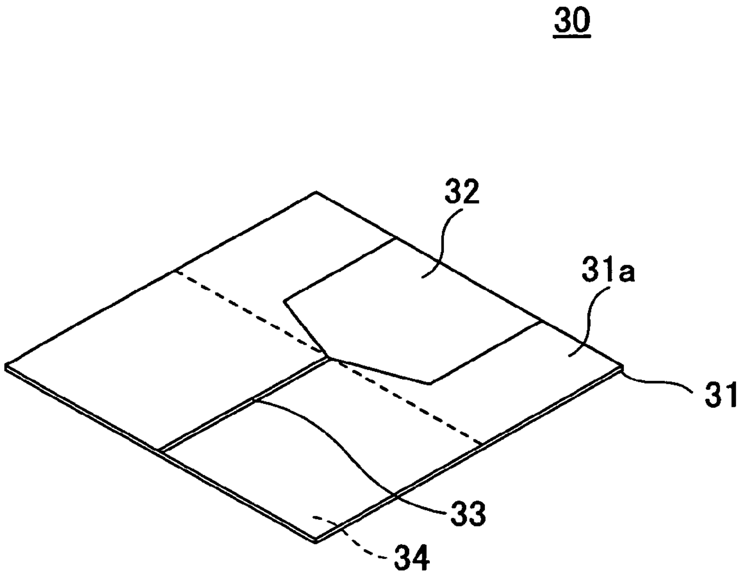
FIG. 2A and FIG. 2B are schematic diagrams of a UWB flat antenna apparatus, for which patent application has been made by the applicant hereto.
Figure 2B:
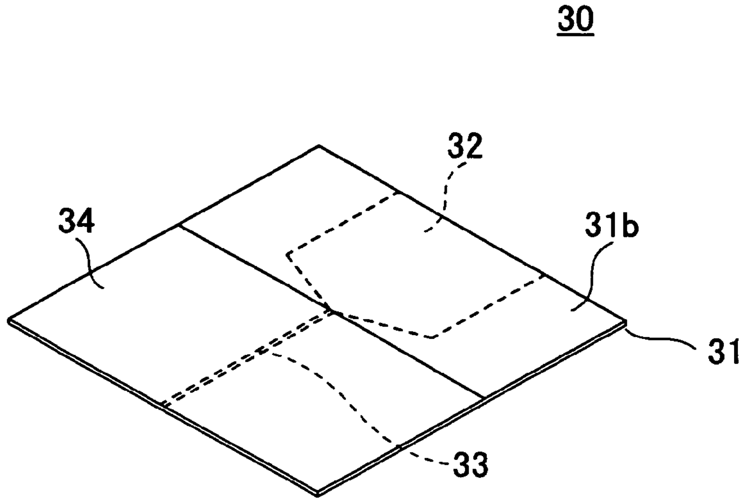
Figure 3A:
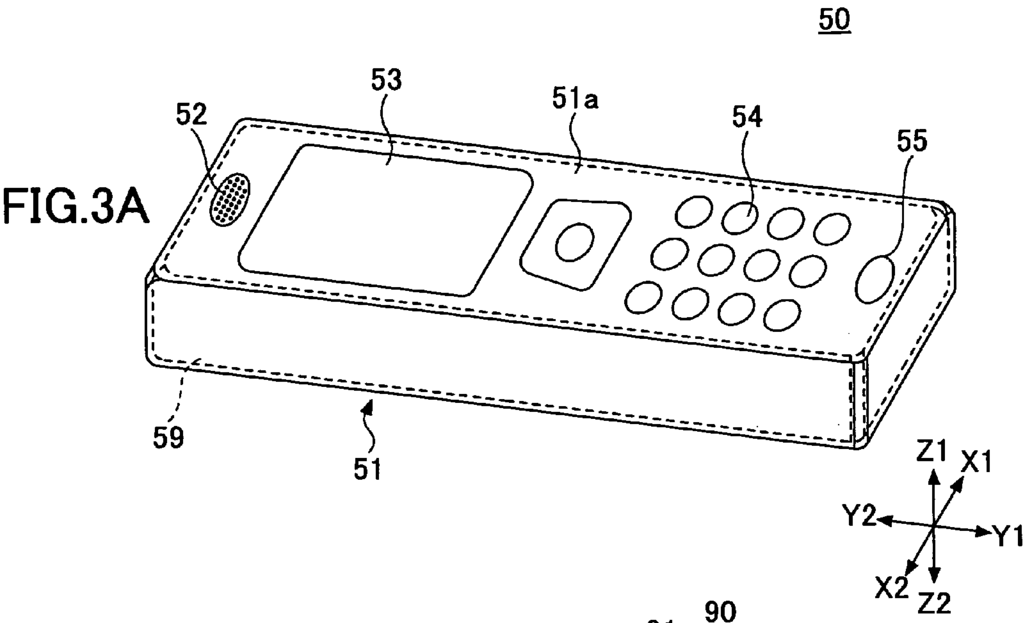
FIGS. 3A and 3B are a perspective diagrams of a portable telephone according to Embodiment 1 of the present invention.
Figure 3B:
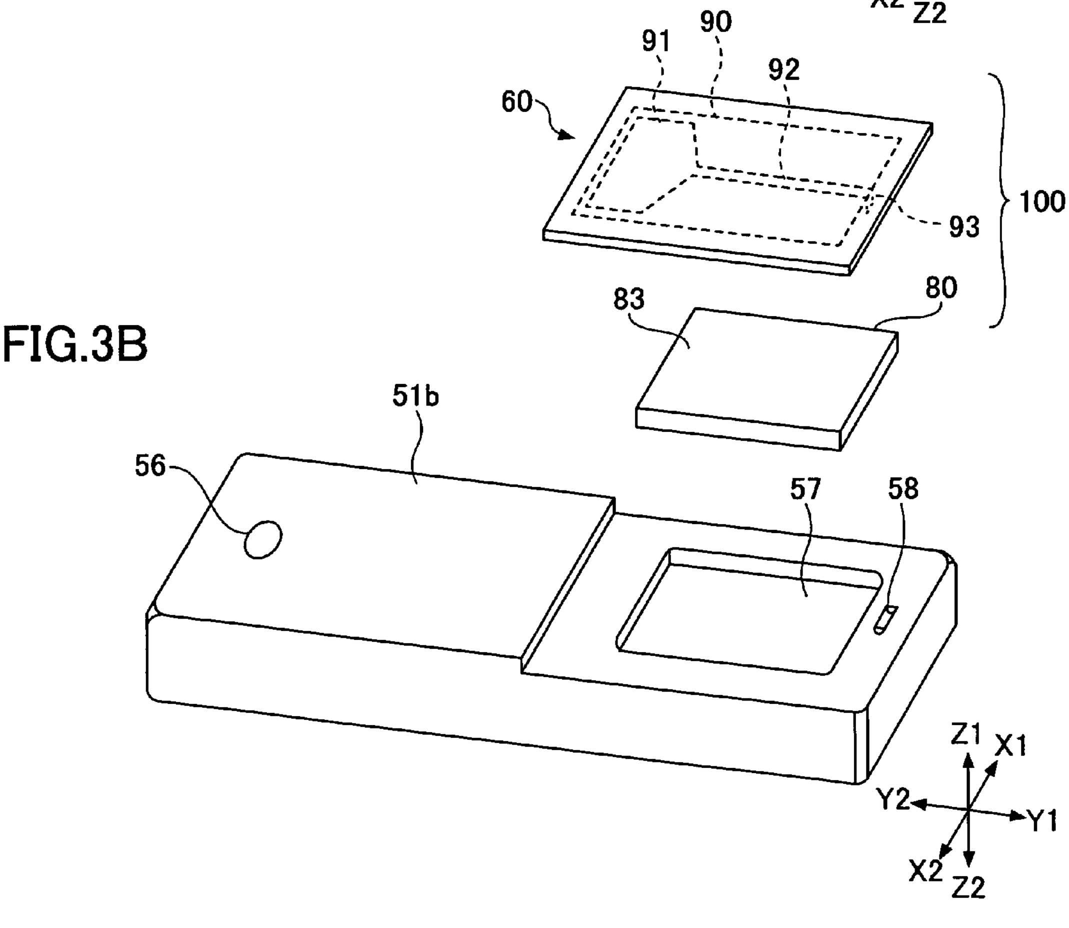

FIG. 3A and FIG. 3B show a portable telephone 50 according to Embodiment 1 of the present invention. The portable telephone 50 includes a UWB flat antenna apparatus 100. The UWB flat antenna apparatus 100 uses a surface 83 (front surface) of a battery 80; the surface 83 serves as a ground plane. Directions X1-X2 represent width, directions Y1-Y2 represent length, and directions Z1-Z2 represent thickness of the portable telephone 50.

The portable telephone 50 includes a loudspeaker 52, a liquid crystal panel 53, an operating unit 54, and a microphone 55, which are arranged on an upper surface 51*a* of a body 51. On an undersurface 51*b* of the body 51, a camera unit 56, a battery holding section 57, and a connector 58 are arranged. Further, the battery holding section 57 holds the battery 80, and a battery cover 60 covers the battery 80. A shielding member 59 is arranged inside of the body 51.

Figure 7:
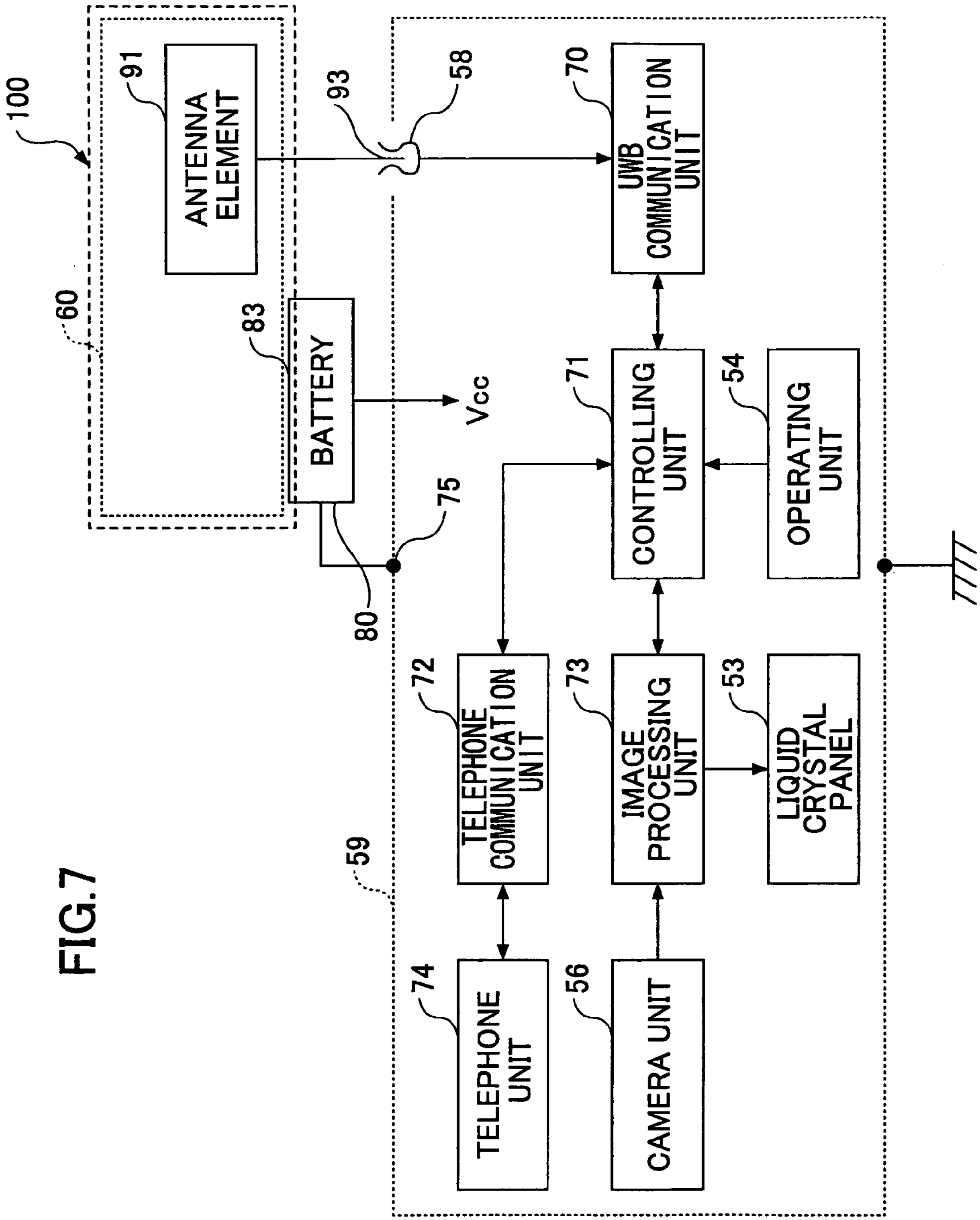
FIG. 7 is a block diagram of the portable telephone shown in FIG. 3.

The connector 58 is arranged near the battery holding section 57 as shown in FIG. 3B, and is electrically connected to a UWB communication unit 70 as shown in FIG. 7.

The portable telephone 50 according to Embodiment 1 is different from the conventional portable telephone in that the former includes the UWB communication unit 70 and the connector 58 as shown in FIG. 7. Commands are issued to the controlling unit 71 by the operating unit 54. The controlling unit 71 controls the UWB communication unit 70, a telephone communication unit 72, and an image processing unit 73. A telephone unit 74 includes the loudspeaker 52 and the microphone 55, and is operated by the telephone communication unit 72 so that communications are performed through the UWB flat antenna apparatus 100. The liquid crystal panel 53 is driven by a signal provided by the image processing unit 73. Image data photographed by the camera unit 56 are processed by the image processing unit 73, are displayed on the liquid crystal panel 53, and are transmitted from the UWB flat antenna apparatus 100. The battery 80 supplies a driving voltage Vcc to the controlling unit 71, the UWB communication unit 70, the telephone communication unit 72, the image processing unit 73, and so on.

Figure 5:
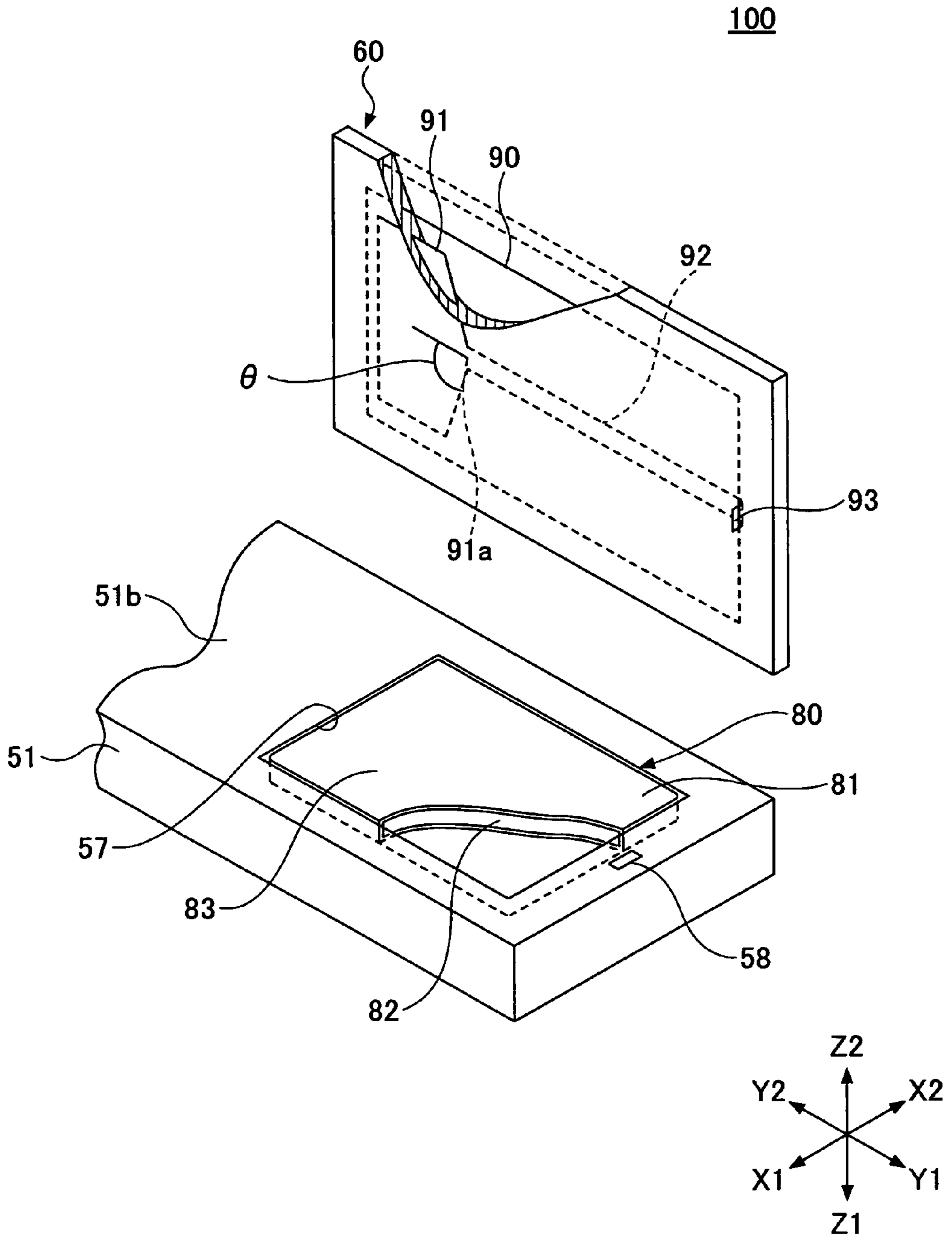
FIG. 5 is a perspective diagram showing correspondence of the battery cover to a battery space, where a cross section of a part of the battery cover is presented.

The battery 80 is constituted by a battery element 82 contained in a battery box 81 made of a steel plate in the shape of a flat square as shown in FIG. 5. The battery 80 is accommodated in the battery holding section 57 for supplying the driving voltage Vcc to the controlling unit 71, and the like. Further, when the battery 80 is accommodated in the battery holding section 57, the battery box 81 and the shielding member 59 are electrically connected at a point 75 shown in FIG. 7. Accordingly, where the battery 80 is accommodated in the battery holding section 57, the surface 83 of the battery 80 is exposed in the Z2 direction, as shown in FIG. 5. The surface 83 is flat and square, and has ground potential.

Figure 4:
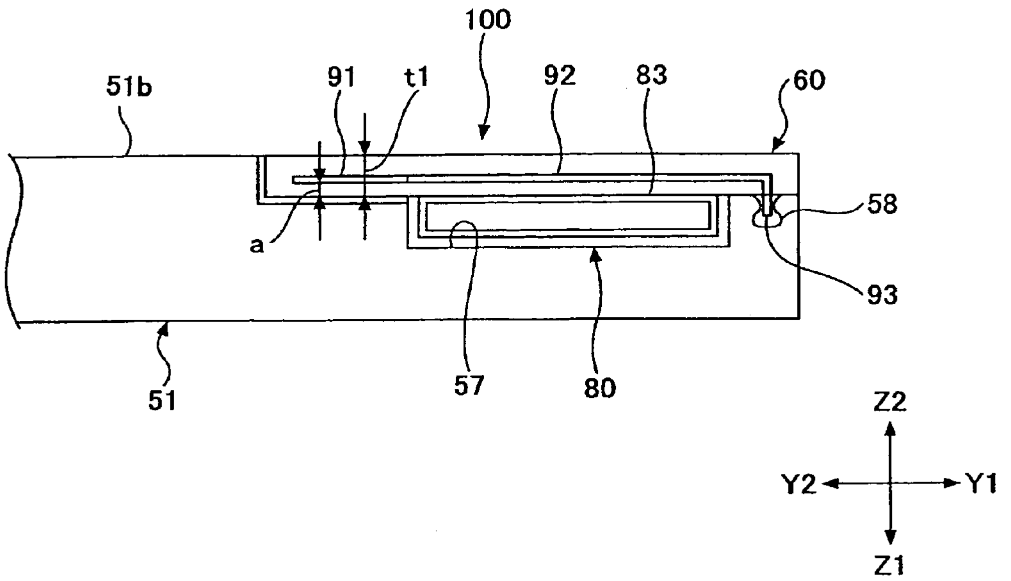
FIG. 4 is a cross-sectional diagram of a battery cover and vicinity of the portable telephone shown in FIG. 3.

The battery cover 60 is made by molding resin in the shape of a plate as shown in FIGS. 4 and 5. An antenna film 90 is insert-molded inside the battery cover 60. An antenna element unit 91 in the shape of a home plate and a wire-element part 92 are formed on the antenna film 90. The wire-element part 92 is prolonged from an apex section (feeding point) 91*a* of the antenna element unit 91. At the other end of the wire-element part 92, a contact part 93 is formed. The contact part 93 is bent at a right angle to the wire-element part 92, and is projected from the undersurface of the battery cover 60. An angle θ at the feeding point 91*a* of the antenna element unit 91 is about 60°.

Figure 6:
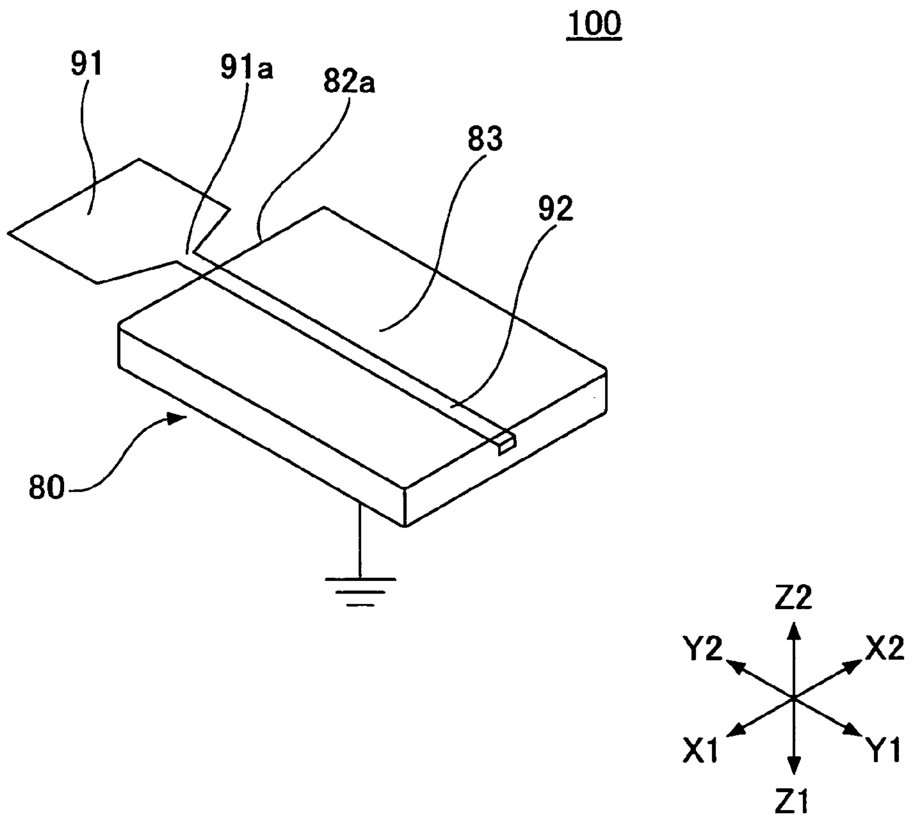
FIG. 6 is a perspective diagram showing a part that constitutes a UWB flat antenna apparatus.

The size (length) of the battery cover 60 is greater than the size (length) of the battery holding section 57; the size of the wire-element part 92 is equivalent to the battery holding section 57. That is, the antenna element unit 91 is prolonged in the Y2 direction beyond the battery holding section 57. The battery cover 60 is attached to the body 51 with the antenna element unit 91 arranged immediately next to the battery holding section 57 in the Y2 direction.

Where the battery 80 is installed in the battery holding section 57, and the battery cover 60 is attached to the undersurface 51*b* of the body 51 to cover the battery 80 as shown in FIG. 4, a relationship is formed between the antenna film 90 and the surface 83 of the battery 80 is as shown by FIG. 6. That is, the antenna element unit 91 is located in a first plane that is parallel to a second plane in which the surface 83 of the battery 80 is located. The first plane and the second plane are separated by a distance "a" (FIG. 4) that is one half of a thickness t1 of the battery cover 60, the distance "a" being equal to or less than 1 mm. Further, the feeding point (apex) 91*a* is located approximately immediately above in the Z2 direction a side 82*a* (FIG. 6) of the surface 83, where the side 82*a* is in the Y2 direction. The wire-element part 92 is arranged in the first plane, and runs along the surface 83 in the Y1 direction. Further, the contact part 93 is connected to the connector 58.

As described above, the UWB flat antenna apparatus 100 is constituted by the antenna element unit 91, the wire-element part 92, and the surface 83, where the surface 83 serves as a ground element (ground plane). Since the battery 80 is installed in the battery holding section 57, and the battery box 81 is electrically connected to the shielding member 59, it becomes unnecessary to connect a coaxial cable to the UWB flat antenna apparatus 100, simplifying the structure of the UWB flat antenna apparatus 100.

The portable telephone 50 employs the UWB flat antenna apparatus 100 wherein the surface 83 of the battery 80 serves as the ground element, and accordingly, is made smaller, especially thinner than conventional portable telephones that employ an independent UWB flat antenna apparatus.

Embodiment 2

Figure 8:
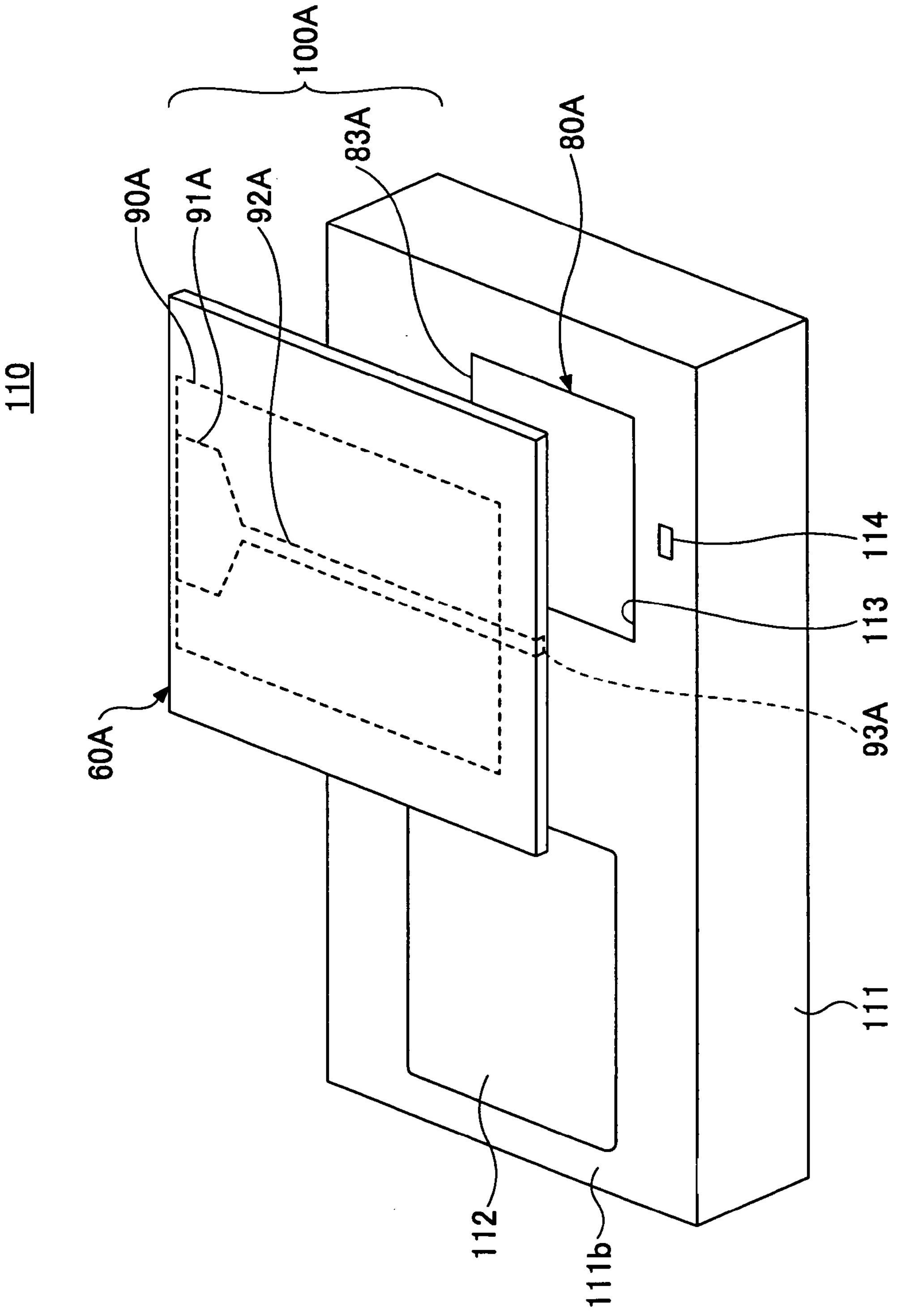
FIG. 8 is a perspective diagram of a digital camera according to Embodiment 2 of the present invention.

FIG. 8 shows a digital camera 110 according to Embodiment 2 of the present invention. The digital camera 110 includes a main body 111, a lens (not illustrated) attached to a first side of the body 111, a liquid crystal panel 112 arranged on a second side 111*b* that is opposite to the first side, a battery holding section 113, a connector 114, a battery 80A shaped like a flat square accommodated in the battery holding section 113, and a battery cover 60A. Inside of the battery cover 60A, an antenna film 90A is insert-molded. The battery cover 60A is attached to the main body 111 such that the battery 80A is covered. Further, a contact part 93A is connected to the connector 114.

With the structure described above, a surface 83A of the battery 80A functions as a ground element, and a UWB flat antenna apparatus 100A is constituted by an antenna element unit 91A, the surface 83A, and a wire-element part 92A.

Since the digital camera 110 employs the UWB flat antenna apparatus 100A wherein the surface 83A of the battery 80A serves as the ground element, the digital camera 110 is made smaller, especially thinner than conventional digital cameras that employ an independent UWB flat antenna apparatus.

Further, the present invention is not limited to these embodiments, but variations and modifications may be made without departing from the scope of the present invention.

The present application is based on Japanese Priority Application No. 2006-108872 filed on Apr. 11, 2006 with the Japanese Patent Office, the entire contents of which are hereby incorporated by reference.

What is claimed is:

1. A portable apparatus, comprising:

a housing having a planar surface;

a battery holding section formed as a recess in the planar surface of the housing;

a battery having a first end, a second opposite end, a first surface serving as a ground potential and said battery being received within the recess;

a communication unit connector formed in the planar surface of the housing and being electrically connected to the battery to receive a driving voltage different from the ground potential;

a planar battery cover which has a cover periphery including a first end and a second end, and a central portion therebetween, which cover periphery is received by the planar surface and the central portion covers the battery;

a one piece antenna element formed on the battery cover and being capable of transmission for communication, the antenna element having a flat body at the first end of the cover periphery, a contact part at the second end of the cover periphery, and a connector co-planar with the flat body and extending along the central portion for connecting the flat body and the contact part, the contact part projecting perpendicularly at the second end of the cover periphery and being electrically connected to the communication unit connector, wherein the battery is received in the battery holding section with the first and second ends thereof corresponding to the first and second ends of the battery cover, with the first surface of the battery extending toward the cover central portion, and the cover closes the battery holding section, with the flat body facing the housing planar surface, and outside the first end of the battery, and the contact part extending outside the second end of the battery, wherein the antenna and the battery are continuously-spaced from each other, wherein the cover and the battery are separate and individually removable from the housing, wherein the first surface of the battery serves as a ground element for the antenna element, and the antenna element and the first surface of the battery serve as a flat antenna apparatus, and wherein the cover has a thickness and the space is one half the thickness.

2. The portable apparatus as recited in claim 1, wherein the battery is electrically connected with a shielding member in the housing.

3. The portable apparatus as recited in claim 1, wherein the battery holding section has a length, and the cover has a length that is greater than a length of the battery holding section.

4. The portable apparatus as recited in claim 3, wherein the antenna element has a length which is greater than a length of the battery holding section.

5. The portable apparatus as recited in claim 1, wherein the battery holding section is formed as a recess entirely within the housing with opposing walls defining the recess.

6. The portable apparatus as recited in claim 1, wherein the space is equal to or less than 1 mm.

7. The portable apparatus as recited in claim 1, wherein the battery is received in a metal battery box.

* * * * *